(12) United States Patent
Klug et al.

(10) Patent No.: US 6,516,840 B1
(45) Date of Patent: *Feb. 11, 2003

(54) EXPLOSIVES COMPRISING MODIFIED COPOLYMERS OF POLYISOBUTYLENE AND MALEIC ANHYDRIDE AS EMULSIFIERS

(75) Inventors: Peter Klug, Grossostheim; Ralf Bender, Oberursel, both of (DE)

(73) Assignee: Clariant GmbH, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/419,215

(22) Filed: Oct. 15, 1999

(30) Foreign Application Priority Data

Oct. 16, 1998 (DE) .......................... 198 47 868

(51) Int. Cl.[7] .......................... C06B 45/00; C06B 31/28
(52) U.S. Cl. .............................. 144/2; 149/46
(58) Field of Search ........................ 149/2, 46, 109.4, 149/109.6

(56) References Cited

U.S. PATENT DOCUMENTS

| | | | |
|---|---|---|---|
| 3,447,978 A | | 6/1969 | Bluhm |
| 4,822,433 A | * | 4/1989 | Cooper et al. ................. 149/2 |
| 4,844,756 A | | 7/1989 | Forsberg ....................... 149/2 |
| 4,931,110 A | * | 6/1990 | McKenzie et al. ............. 149/2 |
| 4,936,931 A | * | 6/1990 | Nguyen et al. ................ 149/2 |
| 4,936,932 A | * | 6/1990 | Nguyen .......................... 149/2 |
| 4,999,062 A | | 3/1991 | Snare et al. .................... 149/2 |
| 5,034,071 A | * | 7/1991 | VanOmmeren ................. 149/7 |
| 5,112,507 A | | 5/1992 | Harrison .................... 252/51.5 |
| 5,407,500 A | * | 4/1995 | Forsberg et al. ............... 149/2 |
| 5,456,775 A | * | 10/1995 | Schapira et al. ......... 149/109.6 |
| 5,565,528 A | | 10/1996 | Harrison et al. ......... 525/327.6 |
| 5,616,668 A | | 4/1997 | Harrison et al. ............ 526/271 |
| 5,792,729 A | | 8/1998 | Harrison et al. ............ 508/192 |
| 5,920,031 A | | 7/1999 | Jahnke .......................... 149/2 |

FOREIGN PATENT DOCUMENTS

| | | |
|---|---|---|
| AU | 618156 | 6/1990 |
| EP | 0155800 | 9/1985 |
| EP | 0 330 375 | 8/1989 |
| EP | 0 561 600 | 9/1993 |
| EP | 0 657 475 | 6/1995 |
| EP | 0 831 104 | 3/1998 |
| EP | 0831104 | 3/1998 |
| WO | WO 89/05848 | 6/1989 |
| WO | WO 90/03359 | 4/1990 |

OTHER PUBLICATIONS

"Highly Reactive Polyisobutene as a Composition Element for a New Generation of Lubricant Additives," H. Mach, Oil Gas European Magazine, vol. 22, 1996, pp. 38–40.
EPO Search Report.
European Search Report.
"Highly Reactive Polyisobutene as a Composition Element for a New Generation of Lubricant Additives," by H. Mach, OIL GAS –European Magazine 2/1996, pp. 38–40.
XP–002201091 –Abstract of JP 64000109 A, May 01, 1989.
XP–002201092 –Abstract of JP 9183815 A, Jul. 15, 1997.

* cited by examiner

Primary Examiner—Michael J. Carone
Assistant Examiner—Aileen J. Baker
(74) Attorney, Agent, or Firm—Susan S. Jackson; Scott E. Hanf

(57) ABSTRACT

The invention provides an explosive composition consisting of
A) an oxygen-donating constituent, which forms a disperse phase,
B) an organic constituent, which forms a dispersion phase, and
C) at least one emulsifier,
wherein the emulsifier includes a copolymer comprising, in random or regular order, structural units derived from maleic anhydride and from one or more olefins having more than 40 carbon atoms, where the structural units derived from maleic anhydride have been modified by reaction with alcohols, aminoalcohols, ammonia or amines.

11 Claims, No Drawings

EXPLOSIVES COMPRISING MODIFIED COPOLYMERS OF POLYISOBUTYLENE AND MALEIC ANHYDRIDE AS EMULSIFIERS

BACKGROUND OF THE INVENTION

Of the explosives used worldwide today, the ammonium nitrate explosives are the largest group. They are widespread particularly in mining. A particularly important group within the ammonium nitrate explosives in this connection are the emulsion explosives, which consist essentially of a water- (or salt)-in-oil emulsion of an aqueous solution, supersaturated at room temperature, in an oil matrix (fuel). The oil phase is the continuous phase and includes small droplets of the supersaturated solution of the oxidizing agent. In this connection, the water content of the solution can be up to below 4% by weight. The dissolved salts are metastable and have a tendency toward crystallization. If, for example, ammonium nitrate crystals form, this has unfavorable effects on the emulsion (solidification, the emulsion is no longer pumpable) and also on the cap sensitivity of the emulsion, i.e. the explosive becomes less sensitive to initial detonation. In order to keep such an emulsion stable, therefore, an emulsifier is generally required which is suitable for the preparation of water-in-oil emulsions. Because of its surface activity, it promotes emulsification of the salt phase in small droplets and prevents coalescence of the formed droplets after the emulsion has formed.

The emulsion, also called matrix, is generally still not ignitable, and therefore, in order to achieve sufficient cap sensitivity, the density of the matrix must be lowered by adding microspheres (glass bubbles), by chemical gassing or by another method, such as, for example, by adding granular ammonium nitrate. The emulsions are then in some circumstances also ignitable without boosters with blasting caps. Such emulsions are safety explosives. This technology was described for the first time in U.S. Pat. No. 3,447,978. U.S. Pat. No. 3,447,978 discloses explosive emulsions consisting of a salt-in-oil emulsion of a supersaturated ammonium nitrate solution in an oil matrix, an emulsifier of the water-in-oil type, e.g. a sorbitan ester, fatty acid glycerides or phosphoric esters, being used as emulsifiers. These emulsifiers, however, only give emulsions with low long-term stability.

EP-A-0 155 800 discloses emulsion explosive material mixtures which comprise emulsifiers, where at least one emulsifier is strongly lipophilic and an agent for altering the electrical conductivity of the emulsion, which essentially consists of a lipophilic and of a hydrophilic component, and in which the lipophilic constituent has a chain structure derived from a polymer of a monoolefin containing 3–6 carbon atoms. In particular, reaction products of poly (isobutenyl)succinic anhydride with aminoalcohols, amines and sorbitol as emulsifiers are described.

EP-A-0 285 608 discloses water-in-oil emulsions, where the emulsifiers present are reaction products of a hydrocarbon-substituted carboxylic acid or a hydrocarbon-substituted anhydride (or an ester or amide derived therefrom) with ammonia or at least one amine, the hydrocarbon radical having on average 20–500 carbon atoms. Polymers containing two or more hydrocarbon radicals are not disclosed. Reaction products of poly(isobutenyl)succinic anhydrides with morpholine and aminoalcohols are specifically described.

The emulsifiers cited in EP-A-0 155 800 and EP-A-0 285 608 and based on polyisobutenylsuccinic anhydride (i.e. the reaction product of a long-chain, branched olefin with maleic anhydride), produce, in contrast to the emulsifiers of the first generation cited in U.S. Pat. No. 3,447,978, emulsions with high long-term stability. The base emulsifiers, however, have the disadvantage that their synthesis, because of the underlying ene reaction, requires very high temperatures (180–230° C.) and relatively long reaction times, which leads to a high consumption of energy and correspondingly high preparation costs.

Polymers of polyisobutylene and maleic anhydride are also part of the prior art.

WO-A-90/03359 discloses polymers of polyisobutylene and maleic anhydride which, after they have been functionalized using polyamines, can be used as additives in fuels and lubricating oils. EP-A-0 831 104 discloses terpolymers of polyisobutylene, α-olefins and maleic anhydride and also reaction products of these terpolymers with polyamines for analogous applications.

SUMMARY OF THE INVENTION

Surprisingly, we have now found that not only derivatives of monomeric adducts of polyisobutylene and maleic anhydride, but also derivatives of polymeric adducts of maleic anhydride and olefins having 20–500 carbon atoms, alone or mixed with other emulsifiers, are suitable as extremely effective emulsifiers for emulsion explosives. In contrast to the compounds cited in EP-A-0 155 800 and EP-A-0 285 608, these compounds have two or more hydrophobic groups and two or more hydrophilic head groups on the polymer backbone. The parent polymeric anhydrides can be prepared at a significantly lower temperature (80–150° C.) and by free-radical copolymerization significantly more quickly than the alkenylsuccinic acid derivatives of the prior art, meaning that they have ecological and also economic advantages over the prior art. Surprisingly, despite having molecular weights which are significantly higher than those of polyisobutenylsuccinic acid derivatives, the products do not have increased viscosities, meaning that the products can be handled without problems despite the relatively high molecular weight. In this connection, the emulsifying action and emulsion stability of the products, particularly in mixtures with small amounts of coemulsifiers, correspond to at least those of the products cited in the prior art.

The invention thus provides an explosive composition consisting of

A) an oxygen-donating constituent, which forms a disperse phase,

B) an organic constituent, which forms a dispersion phase, and

C) at least one emulsifier, wherein the emulsifier includes a copolymer comprising, in random or regular order, structural units derived from maleic anhydride and from one or more olefins having more than 40 carbon atoms, where the structural units derived from maleic anhydride have been modified by reaction with alcohols, aminoalcohols, ammonia or amines.

DESCRIPTION OF THE PREFERRED EMBODIMENTS

In the text below, the term "maleic anhydride" also refers to the maleic anhydride modified in the sense given above by reaction with alcohols, aminoalcohols, ammonia or amines.

The emulsifier according to the invention comprises, in the copolymer chain, at least one olefin, preferably an α-olefin having more than 40, preferably from 40 to 500, in particular from 40 to 200, carbon atoms. The copolymer may also further comprise other comonomers.

Suitable olefins for the preparation of the polymers according to the invention are olefins preferably containing a double bond in the α-position or mixtures of the number of such olefins. Particular preference is given to olefins obtained by polymerization of $C_2$–$C_6$-monoolefins, such as, for example, polypropylenes or polyisobutylenes in the molecular weight range from, preferably, 200–5000 g/mol, and which comprise >30%, preferably >50%, particularly preferably >70%, of isomers containing a double bond in the α-position, i.e., for example, containing an end group R—C (=$CH_2$)$CH_3$. Such polyisobutylene grades are obtainable, for example, under the trade names Glissopal® or Ultravis®. In this connection, particularly suitable polyisobutylenes are those which have a high content of isomers containing an α-position double bond. Particularly suitable as olefin components are also mixtures of polyisobutylenes and straight-chain or branched-chain $C_{10}$–$C_{30}$-α-olefins or mixtures of polyisobutylenes with alkylallyl polyglycol ethers having from 3 to 20 ethylene oxide units. In this case terpolymers of polyisobutylene, maleic anhydride and α-olefin or allylmethyl polyglycol ethers form. The alkylallyl polyglycol ethers mentioned are preferably allylmethyl polyglycol ethers in the molecular weight range from 200 to 1000 g/mol.

The emulsifiers according to the invention can be synthesized by methods known per se, one description being, for example, in Oil Gas European Magazine 1996, 22, 38–40. Firstly, olefins, preferably α-olefins, particularly preferably polyisobutylene or mixtures of polyisobutylene and short-chain $C_{10}$–$C_{30}$-α-olefins or mixtures of polyisobutylene with allylalkyl polyglycol ethers and maleic anhydride are polymerized using a suitable free-radical initiator. The molar quantity ratio between maleic anhydride and the total of the other comonomers is preferably from 0.7:1 to 1.6:1. The polymerization can be carried out without a diluent, or also in a nonprotic solvent.

The reaction temperature of the polymerization is between 50 and 200° C., preferably between 80 and 160° C. Alternating copolymers of olefin and maleic anhydride preferably form. In the second reaction step, the resulting polymer is reacted in a polymer-analogous reaction with alcohols or aminoalcohols to give polymeric half-esters, with ammonia and/or amines and, where appropriate, also with aminoalcohols, to give polymeric half-amides or imides.

Suitable alcohols for the functionalization of the maleic anhydride copolymers to give half-esters are monoalcohols having 1–6 carbon atoms, e.g. methanol, ethanol, propanols, butanols or pentanols; alkylpolyglycols are also suitable.

Suitable aminoalcohols are, for example, N,N-dimethylaminoethanol, N,N-diethylaminoethanol, N,N-dibutylaminoethanol, 3-dimethylaminopropanol, N-hydroxyethylmorpholine, monoethanolamine, diethanolamine, triethanolamine, 3-aminopropanol, isopropanolamine and 2-(2-aminoethoxy)ethanol. The half-ester formation is carried out at 30 to 150° C., preferably at 50 to 100° C. In order to avoid crosslinking reactions, aminoalcohols with a tertiary amine nitrogen and a hydroxyl function, such as dimethylaminoethanol, diethylaminoethanol or N-hydroxyethyl-morpholine, are particularly preferred.

Suitable amines for the functionalization of the maleic anhydride copolymers are monoamines with a primary or secondary amino function, such as methylamine, ethylamine, butylamine, laurylamine, coconut fatty amine, stearylamine, dimethylamine, diethylamine, dibutylamine etc., but also di- and polyamines, e.g. 3-dimethylaminopropylamine, 3-diethylaminopropylamine or 3-morpholinopropylamine.

Preferred amines contain only one condensable alcohol or amino group in order to prevent crosslinking of the individual polymer units. Using the amines listed, olefin/MA copolymers (MA=maleic anhydride) functionalized to the half-amide are obtained at reaction temperatures of at most 50–60° C. Above 50° C., imide formation arises to an increased extent, meaning that, should olefin/MA copolymers functionalized to the imide be desired, it is preferable to carry out the reaction in the temperature range from about 50 to about 150° C.

The reactions to give the half-esters, half-amides and imides can be carried out either without a diluent, or else in a solvent, preferably in the mineral oil used for formation of the explosive emulsion. The latter is particularly preferred, in cases where the viscosity of the emulsifier permits it.

The emulsifiers according to the invention can be mixed with any common emulsifier. Preferred mixing components are the water-in-oil emulsifiers used in U.S. Pat. No. 3,447,978, such as sorbitan monooleate, glycerides, phosphoric esters, etc., but also amidoamines/imidazolines obtainable by condensation of fatty acids with polyamines. Particular preference is given to mixtures of the emulsifiers according to the invention with the monomeric emulsifiers specified in EP-A-0 155 800 and EP-A-0 285 608, i.e. with derivatives of alkenylsuccinic anhydrides, such as polyisobutenylsuccinic anhydride, i.e. half-esters, half-amides, imides and salts thereof with amines and alkali metals.

The emulsifiers according to the invention are suitable for use as constituent C in the explosive compositions (emulsion explosives) of the invention.

The salt phase of the emulsion explosive (constituent A) consists of a supersaturated solution of an oxygen-releasing salt, ammonium nitrate preferably being used. Other oxygen-releasing salts, e.g. other nitrates such as sodium or potassium nitrate, and also perchlorates can also be used as additives.

The oil phase (constituent B) used is generally a mineral oil, in particular a paraffin mineral oil. It is also possible to use naphthene-based oils, vegetable oils, used oil or diesel oil. The emulsifiers used are mostly predissolved in the oil phase. The emulsifiers can be used as concentrate (up to 100% of active substance) or else as solution in a suitable oil, in cases where the inherent viscosity of the emulsifier is too high.

Further auxiliaries are bodying agents such as waxes, paraffins or elastomers, in cases where the intention is to prepare cartridged explosive, products which are said to increase the water resistance of the emulsion, such as silicone oils, but also other emulsion stabilizers, thickeners or antioxidants, which are intended to prevent aging of the emulsifier.

The explosive emulsion generally comprises 20–97% by weight, preferably 30–95% by weight, particularly preferably 70–95% by weight, of the discontinuous phase (i.e. predominantly water and ammonium nitrate with the other water-soluble additives), and the water content varies in the range 2–30%, preferably in the range 4–20%. The oil phase (including the additives dissolved therein) includes about 1–20% by weight of the overall composition, but preferably 1–10%. The content of emulsifier in the overall composition is in the range 0.2–5% by weight, preferably in the range 0.4–3%.

The explosive emulsions are preferably prepared using common emulsifying processes. Firstly, a supersaturated ammonium nitrate solution (optionally with the addition of other water-soluble auxiliaries listed above) at 80–100° C. is prepared and heated until all solids are dissolved, and, if necessary, the solution is filtered to remove insoluble material. In parallel, a solution of the emulsifier in the oil matrix (likewise with the addition of other oil-soluble auxiliaries such as waxes, paraffins, antioxidants etc.), likewise at 50–100° C., is prepared. Then, with stirring, the salt melt is preferably added to the oil/emulsifier mixture, but the reverse procedure is also possible. Vigorous stirring increases emulsion formation. The entrainment of seed crystals into the emulsion must be avoided. Where appropriate, other components, such as microballoons (glass bubbles), solids such as TNT, solid fuels such as aluminum or sulfur, inert materials such as baryte or sodium chloride, or undissolved ammonium nitrate are then added, and the mixture is stirred until the solids are distributed homogeneously. Chemical gassing involves adding, for example, thiourea and sodium nitrite, which leads to gassing of the emulsion within a certain period. In industry, the emulsification stage can be carried out in special mixers and, where appropriate, using static mixers.

The invention further provides a terpolymer comprising monomer units derived from A) an olefin having more than 40 carbon atoms,
B) maleic anhydride, and
C) an alkylallyl polyglycol ether of the formula

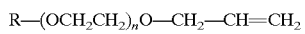

where n=3–20 and R=$C_1$–$C_4$-alkyl.

The olefin preferably has from 40 to 500, in particular from 40 to 200, carbon atoms. It is preferably an α-olefin, particularly preferably a polyisobutene. A particularly preferred embodiment relates to modified terpolymers obtained by polymer-analogous reaction of the said terpolymers with alcohols, amines and aminoalcohols. The terpolymers according to the invention are used as emulsifiers in explosive compositions.

Particularly preferred terpolymers comprise monomer units of

A) 18 to 70 mol % of polyisobutene
B) 25 to 80 mol % of maleic anhydride
C) 2 to 15 mol % of allyl polyglycol ether.

As the experimental examples listed below demonstrate, the polymeric emulsifiers according to the invention, alone or in particular in a mixture with other emulsifiers, such as, for example, sorbitan esters, exhibit identical emulsion stabilities to a conventional polyisobutenylsuccinic acid derivative. It is interesting that the functionalization of the polymeric anhydride, at least in mixtures with other emulsifiers, is not absolutely necessary. Under the conditions of the emulsification, the corresponding amide presumably forms from the anhydride and ammonium nitrate in situ.

EXAMPLES

Synthesis of the Polymeric Emulsifier

Example 1

Copolymer of Maleic Anhydride and Polyisobutylene

A 2 l four-necked flask fitted with a stirrer was charged with 900 g (0.90 mol) of a polyisobutylene with a molecular weight of 1000 g/mol and 88.2 g (0.90 mol) of maleic anhydride; the charge was heated to 100° C. The system was then evacuated 3× up to 100 mbar and aerated in each case with nitrogen in order to render it inert. The contents were heated to 115° C. and 9.9 g (1% by weight) of di-tert-butyl peroxide were added. The reaction mixture was heated further to 150° C., and the reaction temperature increased briefly to 160° C. The system was then maintained for 4 h at 150° C. Then, at 150° C., a reduced pressure of 20 mbar was applied, although no distillate was obtained. Cooling gave 986 g of a yellowish oil with a viscosity of 4.1 Pas at 80° C. (Bohlin, $10s^{-1}$).
Molecular weight (GPC): Mn=1608 g/mol, Mw=3621 g/mol
Residual olefin content: 48%

Example 2

Copolymer of Maleic Anhydride, Polyisobutylene and $C_{18}$-α-olefin

A 1 l four-necked flask fitted with stirrer was charged with 600 g (0.60 mol) of a polyisobutylene with a molecular weight of 1000 g/mol, 50 g (0.2 mol) of a $C_{18}$-α-olefin and 78.4 g (0.80 mol) of maleic anhydride; the contents were heated to 100° C. The system was then evacuated 3× up to 100 mbar and aerated each time with nitrogen to render it inert. The contents were heated to 120° C., and 7.3 g (1% by weight) of di-tert-butyl peroxide were added. The reaction mixture was heated again to 150° C., and the reaction temperature increased briefly to 160° C. The system was then maintained for 4 h at 150° C. Then, at 150° C., a reduced pressure of 20 mbar was applied, although no distillate was obtained. Cooling gave 725.8 g of an orange-red oil with a viscosity of 4.0 Pas at 80° C. (Bohlin, $10s^{-1}$).

Example 3

Copolymer of Maleic Anhydride, Polyisobutylene and Allylmethyl Polyglycol Ether with a Molecular Weight of 334 g/mol A 2 l four-necked flask fitted with stirrer was charged with 1200 g (1.20 mol) of a polyisobutylene with a molecular weight of 1000 g/mol, 133.6 g (0.4 mol) of allylmethyl polyglycol ether and 156.8 g (1.60 mol) of maleic anhydride; the contents were heated to 100° C. The system was then evacuated 3× up to 100 mbar and aerated each time with nitrogen to render it inert. The contents were heated to 120° C., and 14.9 g (1% by weight) of di-tert-butyl peroxide were added. The reaction mixture was again heated to 150° C., and the reaction temperature increased briefly to 155° C. The system was then maintained for 4 h at 150° C. Then, at 150° C., a reduced pressure of 30 mbar was applied, and 4.0 g of distillate were obtained. Cooling gave 1469.6 g of a yellowish oil with a viscosity of 3.6 Pas at 80° C. (Bohlin, $10s^{-1}$).
Molecular weight (GPC): Mn=1540 g/mol, Mw=3460 g/mol
Residual olefin content: 52%

Example 4

Reaction of Example 1 with Diethylaminoethanol

A 2 l four-necked flask fitted with stirrer was charged with 312 g of a paraffinic mineral oil and 657 g of the copolymer from Example 1; the contents were heated to 90° C. Over the course of 10 min, 70.3 g (0.6 mol) of N,N-diethylethanolamine were added dropwise, and the mixture was stirred for 5 h at 90° C. This gave 1036 g of a yellow oil.

Example 5

Reaction of Example 2 with Diethylaminoethanol

A 2 l four-necked flask fitted with stirrer was charged with 175.6 g of a paraffinic mineral oil and 362.9 g of the copolymer from Example 2; the contents were heated to 90° C. Over the course of 10 min, 46.9 g (0.4 mol) of N,N-diethylethanolamine were added dropwise, and the mixture was stirred for 5 h at 90° C. This gave 582.4 g of a brown oil.

Example 6

Reaction of Example 3 with Diethylaminoethanol

A 2 l four-necked flask fitted with stirrer was charged with 355.1 g of a paraffinic mineral oil and 734.8 g of the copolymer from Example 3; the contents were heated to 90° C. Over the course of 10 min, 93.8 g (0.6 mol) of N,N-diethylethanolamine were added dropwise, and the mixture was stirred for 5 h at 90° C. This gave 1180.6 g of a red-brown oil.

Example 7

Comparative Example

This emulsifier was obtained by reacting a polyisobutyenylsuccinic anhydride (molecular weight of the parent polyisobutene: 950 g/mol) with one mole equivalent of 2-diethylaminoethanol at 90° C.

Example 8

Comparative Example

The comparative emulsifier used was a commercially available sorbitan monooleate.

Example 9

Comparative Example

This emulsifier was obtained by condensation of tall oil fatty acid and triethylenetetramine in the molar ratio 3:1 at 230° C. and at a reduced pressure of 20 mbar.

Example 10

The emulsifier of Example 4 was mixed in the mass ratio 80:20 (taking into consideration the active substance content) with the comparative emulsifier of Example 7 and homogenized at 60° C.

Example 11

The emulsifier of Example 4 was mixed in the mass ratio 80:20 (taking into consideration the active substance content) with the comparative emulsifier of Example 8 and homogenized at 60° C.

Example 12

The emulsifier of Example 4 was mixed in the mass ratio 50:50 (taking into consideration the active substance content) with the comparative emulsifier of Example 7 and homogenized at 60° C.

Example 13

The emulsifier of Example 1 was mixed in the mass ratio 50:50 (taking into consideration the active substance content) with the comparative emulsifier of Example 7 and homogenized at 60° C.

Example 14

The emulsifier of Example 5 was mixed in the mass ratio 50:50 (taking into consideration the active substance content) with the comparative emulsifier of Example 7 and homogenized at 60° C.

Example 15

The emulsifier of Example 6 was mixed in the mass ratio 50:50 (taking into consideration the active substance content) with the comparative emulsifier of Example 7 and homogenized at 60° C.

Example 16

The emulsifier of Example 4 was mixed in the mass ratio 90:10 (taking into consideration the active substance content) with the comparative emulsifier of Example 8 and homogenized at 60° C.

Example 17

The emulsifier of Example 4 was mixed in the mass ratio 90:10 (taking into consideration the active substance content) with the comparative emulsifier of Example 7 and homogenized at 60° C.

Example 18

Copolymer of Maleic Anhydride and Polyisobutene:

A 2 l four-necked flask fitted with stirrer was charged, under a nitrogen atmosphere, with 700 g (0.70 mol) of a polyisobutylene with a molecular weight of 1000 g/mol, 500 g of 1,2-dichloroethane, 68.6 g (0.70 mol) of maleic anhydride and 7.7 g of tert-butyl perbenzoate; the contents were heated to 80° C. The reaction mixture was in the form of a clear solution. The system was then maintained for 33 h at 80° C. Then, at 150° C. and a maximum reduced pressure of 20 mbar, 1,2-dichloroethane and excess maleic anhydride were distilled off. Cooling gave 745 g of a yellowish, high-viscosity oil.

Molecular weight (GPC): $M_n$=1949 g/mol, $M_w$=5081 g/mol.

Residual olefin content: 66%

Example 19

Copolymer of Maleic Anhydride and Polyisobutene:

A 2 l four-necked flask fitted with stirrer was charged, under a nitrogen atmosphere, with 800 g (0.80 mol) of a polyisobutylene with a molecular weight of 1000 g/mol, 545 g of xylene, 78.4 g (0.80 mol) of maleic anhydride and 8.8 g of tert-butyl perbenzoate; the contents were heated to 80° C. The reaction mixture was in the form of a clear solution. The system was then maintained for 30 h at 80° C. Then, at a maximum of 200° C. and a maximum reduced pressure of 20 mbar, xylene and excess maleic anhydride were distilled off. Cooling gave 869 g of a yellowish, high-viscosity oil.

Molecular weight (GPC): $M_n$=1820 g/mol, $M_w$=4520 g/mol

Residual olefin content: 56%

Example 20

Copolymer of Maleic Anhydride and Polyisobutene:

A 2 l four-necked flask fitted with stirrer was charged with 1000 g (1.00 mol) of a polyisobutylene with a molecular weight of 1000 g/mol, 127.4 g (1.30 mol) of maleic anhydride and 538 g of xylene; the contents were heated to 100°

C., and the system was rendered inert by evacuating 3× up to a reduced pressure of 300 mbar and aerating with nitrogen. At 120° C., 11.3 g of di-tert-butyl peroxide were then added over the course of 5 min, and the reaction mixture was heated to 145° C. (reflux). The system was then maintained for 4 h at this temperature. Then, at a maximum of 200° C. and a maximum reduced pressure of 20 mbar, xylene and excess maleic anhydride were distilled off. Cooling gave 1137 g of a yellowish, high-viscosity oil.
Molecular weight (GPC): Mn=1352 g/mol, Mw=2520 g/mol
Residual olefin content: 38.5%

Example 21
Reaction of Example 18 with Diethylethanolamine:

A 1 l four-necked flask fitted with stirrer was charged with 270 g of a paraffinic mineral oil and 571 g of the copolymer of Example 18; the contents were heated to 90° C. Over the course of 10 min, 58.6 g (0.5 mol) of N,N-diethylethanolamine were added dropwise, and the mixture was stirred for 5 h at 90° C. This gave 896 g of a yellow oil.

Example 22
Reaction of Example 19 with Diethylethanolamine:

A 2 l four-necked flask fitted with stirrer was charged with 305 g of a paraffinic mineral oil and 654 g of the copolymer from Example 19; the contents were heated to 90° C. Over the course of 10 min, 58.6 g (0.5 mol) of N,N-diethylethanolamine were added dropwise, and the mixture was stirred for 5 h at 90° C. This gave 1015 g of a yellow oil.

Example 23
Reaction of Example 20 with Diethylethanolamine:

A 1 l four-necked flask fitted with stirrer was charged with 212 g of a paraffinic mineral oil and 437 g of the copolymer from Example 20; the contents were heated to 90° C. Over the course of 10 min, 58.6 g (0.5 mol) of N,N-diethylethanolamine were added dropwise, and the mixture was stirred for 5 h at 90° C. This gave 701 g of a yellow, clear oil.

Example 24

The emulsifier of Example 21 was mixed in the mass ratio 50:50 with the comparative emulsifier of Example 7 and homogenized at 60° C.

Example 25

The emulsifier of Example 22 was mixed in the mass ratio 50:50 with the comparative emulsifier of Example 7 and homogenized at 60° C.

Example 26

The emulsifier of Example 23 was mixed in the mass ratio 50:50 with the comparative emulsifier of Example 7 and homogenized at 60° C.

Determination of the molecular weights of the base polymers (Examples 1–3, 18–20): The molecular weights were determined by gel permeation chromatography (GPC) using tetrahydrofuran as eluent against polyisobutene as standard; the values given were for Mn and Mw. The molecular weight determinations include the unreacted polyisobutene present in the polymeric anhydride. The actual molecular weights of the polymeric anhydride are accordingly considerably higher.

Determination of the residual olefin content (Examples 1–3, 18–20): About 5–10 g of the polymeric anhydrides were chromatographed over 100 g of silica gel 60 using pentane as the eluent. The residual olefin is eluted here with an $R_F$ value of about 0.9. The corresponding fractions were combined, the solvent was distilled off and the residue was weighed.

Preparation of the Test Emulsion

The test emulsion used has the following composition:
1.0 g of emulsifier (100% of active substance not taking into consideration the oil content)
6.3 g of white oil
81.0 g of ammonium nitrate
12.0 g of waterr The white oil together with the emulsifier is introduced at 80° C. into a tall 250 ml beaker and, with stirring using a stainless steel anchor stirrer which passes close to the wall and with an increasing stirring rate from 800 to 2000 rpm, the clear, hot ammonium nitrate/water melt at a temperature of from 95 to 98° C. is introduced. The melt is initially added dropwise and then added in one portion over 15 seconds from a narrow-necked 100 ml Erlenmeyer flask such that it can be stirred in the center of the stirrer blade; the melt must not solidify on the wall. The resulting, transparent emulsion is then stirred at 80° C. for from 3 to 5 min and drawn off while still hot (without any crystals which may have formed).

Emulsion Stability

The shelf life of the prepared emulsions was investigated a) at room temperature (about 20–25° C.) and also b) during storage at fluctuating temperatures (alternating in each case for 24 h at 0° C. and 40° C.). The assessment was visual; the emulsion was no longer regarded as stable if seed crystals had visibly formed.

| Emulsifier | Storage stability at RT (d) | Storage stability at fluctuating temperatures (d) | Polymer component | Additive | Mixing ratio |
|---|---|---|---|---|---|
| Example 1 | 0 | 0 | | | |
| Example 2 | 0 | 0 | | | |
| Example 3 | 0 | 0 | | | |
| Example 4 | >30 | 2 | | | |
| Example 5 | >30 | 2 | | | |
| Example 6 | 0 | 0 | | | |
| Example 7 (Comp.) | >30 | >30 | | | |
| Example 8 (Comp.) | 6 | 4 | | | |
| Example 9 (Comp.) | 6 | 1 | | | |
| Example 10 | >30 | >30 | Example 4 | Example 7 | 80:20 |
| Example 11 | >30 | >30 | Example 4 | Example 8 | 80:20 |
| Example 12 | >30 | >30 | Example 4 | Example 7 | 50:50 |
| Example 13 | >30 | >30 | Example 1 | Example 7 | 50:50 |
| Example 14 | >30 | >30 | Example 5 | Example 7 | 50:50 |
| Example 15 | >30 | >30 | Example 6 | Example 7 | 50:50 |
| Example 16 | >30 | >30 | Example 4 | Example 8 | 90:10 |
| Example 17 | >30 | >30 | Example 4 | Example 7 | 90:10 |
| Example 24 | >30 | >30 | Example 21 | Example 7 | 50:50 |
| Example 25 | >30 | >30 | Example 22 | Example 7 | 50:50 |
| Example 26 | >30 | >30 | Example 23 | Example 7 | 50:50 |

What is claimed is:

1. An explosive composition consisting of
   A) an oxygen-donating constituent, which forms a disperse phase,
   B) an organic constituent, which forms a dispersion phase, and
   C) at least one emulsifier, wherein the emulsifier includes a copolymer comprising, in random or regular order, structural units derived from maleic anhydride and from one or more olefins having more than 40 carbon atoms, where the structural units derived from maleic anhydride have been modified by reaction with alcohols, aminoalcohols, ammonia or amines.

2. An explosive composition as claimed in claim 1, wherein the composition comprises an alternating copolymer of at least one olefin having ca. 40–500 carbon atoms and maleic anhhydride which has been modified with a) alcohols, b) aminoalcohols, c) ammonia or d) amines.

3. An explosive composition as claimed in claim 1 wherein the olefin is a polymer of short-chain olefins having 2–6 carbon atoms.

4. An explosive composition as claimed in claim 3, wherein the short-chain olefin is butene or a butene isomer.

5. An explosive composition as claimed in claim 1, wherein the olefin used is a mixture of polyisobutylene and $C_{10}$–$C_{30}$-α-olefin.

6. An explosive composition as claimed in 1, wherein the copolymer comprises an alkylallyl polyglycol ether having 3–20 ethylene oxide units as further comonomer.

7. An explosive composition as claimed in claim 1, wherein the polymer of maleic anhydride and olefins is reacted with an aminoalcohol to give a half-ester or a salt of a half-ester of maleic acid.

8. An explosive composition as claimed in claim 7, wherein the aminoalcohol is 2-dimethylaminoethanol or 2-diethylaminoethanol.

9. An explosive composition as claimed in claim 1, wherein a coemulsifier is added to said explosive composition, the coemulsifier being a derivative of an alkenylsuccinicanhydride.

10. An explosive composition as claimed in claim 9, wherein the derivative of an alkenylsuccinic anhydride is a derivative of a polyisobutenylsuccinic anhydride.

11. An explosive composition as claimed in claim 1, wherein a coemulsifier is added to said explosive composition, the coemulsifier used is a sorbitan ester, imidazolines, phosphoric ester or fatty acid ester.

* * * * *